US011265692B2

(12) United States Patent
Mueller

(10) Patent No.: US 11,265,692 B2
(45) Date of Patent: Mar. 1, 2022

(54) CIRCUIT-BREAKER AND MOBILE DEVICE

(71) Applicant: Siemens Aktiengesellschaft, Munich (DE)

(72) Inventor: Gerd Mueller, Falkensee (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 17/015,651

(22) Filed: Sep. 9, 2020

(65) Prior Publication Data
US 2021/0092576 A1 Mar. 25, 2021

(30) Foreign Application Priority Data
Sep. 20, 2019 (DE) .................... 10 2019 214 360.1

(51) Int. Cl.
H04W 4/50 (2018.01)
H02B 13/00 (2006.01)
H01H 71/12 (2006.01)
H04W 4/80 (2018.01)
H02B 1/24 (2006.01)
H04W 84/12 (2009.01)

(52) U.S. Cl.
CPC .............. *H04W 4/50* (2018.02); *H01H 71/12* (2013.01); *H02B 1/24* (2013.01); *H02B 13/00* (2013.01); *H04W 4/80* (2018.02); *H04W 84/12* (2013.01)

(58) Field of Classification Search
CPC .. H04B 17/318; H04W 72/085; H04W 52/24; H04W 52/241; H04W 52/245
See application file for complete search history.

(56) References Cited

U.S. PATENT DOCUMENTS

2009/0072022 A1 3/2009 Tripathi
2009/0253410 A1* 10/2009 Fitzgerald ............. H04W 12/12
455/411

(Continued)

FOREIGN PATENT DOCUMENTS

AT 503172 B1 5/2008
AT 509253 A1 7/2011

(Continued)

OTHER PUBLICATIONS

German Office Action mailed Mar. 3, 2021.

Primary Examiner — Kevin Kim
(74) Attorney, Agent, or Firm — Harness, Dickey & Pierce, P.L.C.

(57) ABSTRACT

A circuit breaker is for protecting a low-voltage circuit when current or current-time limits are exceeded in the low-voltage circuit. The circuit breaker includes an electronic trip unit which initiates an interruption or reduction of the current flow in the low-voltage circuit when first current or current-time limits are exceeded, and second current or current-time limits stored in the electronic trip unit, which are characterized by lower current limits or lower current-time limits, the second limits being activatable by an initiated switchover. A communication unit connected to the electronic trip unit is provided, which enables wireless communication, and the circuit breaker is designed such that when a wireless communication signal is received that exceeds a field strength value, the second limits are activated.

19 Claims, 2 Drawing Sheets

(56) References Cited

U.S. PATENT DOCUMENTS

| | | |
|---|---|---|
| 2010/0283577 A1 | 11/2010 | Koch |
| 2012/0194950 A1 | 8/2012 | Koch |
| 2016/0063822 A1 | 3/2016 | Schwinn et al. |
| 2016/0064915 A1 | 3/2016 | Schwinn |
| 2016/0178673 A1 | 6/2016 | Borgwardt et al. |
| 2016/0322805 A1 | 11/2016 | Franke et al. |
| 2016/0329696 A1 | 11/2016 | Franke et al. |
| 2016/0365214 A1 | 12/2016 | Franke et al. |
| 2017/0053759 A1 | 2/2017 | Borgwardt |
| 2017/0094448 A1* | 3/2017 | Mullin ................. H04W 76/14 |
| 2017/0243702 A1 | 8/2017 | Franke et al. |
| 2018/0076611 A1 | 3/2018 | Geissler et al. |
| 2018/0114660 A1 | 4/2018 | Kupsch et al. |
| 2019/0067929 A1 | 2/2019 | Kopaczewski et al. |
| 2019/0385806 A1 | 12/2019 | Plank et al. |
| 2020/0013574 A1 | 1/2020 | Krauss et al. |
| 2020/0051767 A1 | 2/2020 | Stehle |
| 2020/0252859 A1* | 8/2020 | McKeefery ........... H04W 24/10 |

FOREIGN PATENT DOCUMENTS

| | | |
|---|---|---|
| DE | 10244961 B3 | 2/2004 |
| DE | 102006025605 A1 | 11/2007 |
| DE | 102014217292 A1 | 3/2016 |
| DE | 102014217332 A1 | 3/2016 |
| DE | 102014218831 A1 | 3/2016 |
| DE | 102014218910 A1 | 3/2016 |
| DE | 102015217108 A1 | 3/2016 |
| DE | 102014224173 A1 | 6/2016 |
| DE | 102015216981 A1 | 6/2016 |
| DE | 102015226475 A1 | 11/2016 |
| DE | 102016201651 A1 | 11/2016 |
| DE | 102016202827 A1 | 11/2016 |
| DE | 102015210479 A1 | 12/2016 |
| DE | 102016201659 A1 | 12/2016 |
| DE | 102015216023 A1 | 2/2017 |
| DE | 102016205196 A1 | 10/2017 |
| DE | 102016217425 A1 | 3/2018 |
| DE | 102016221093 A1 | 4/2018 |
| DE | 102017201239 A1 | 7/2018 |
| DE | 102017205003 A1 | 9/2018 |
| DE | 102017205004 A1 | 9/2018 |
| DE | 102017211900 A1 | 1/2019 |
| DE | 102017212477 A1 | 1/2019 |
| DE | 102017214903 A1 | 2/2019 |
| DE | 102017214907 A1 | 2/2019 |
| DE | 102017215820 A1 | 3/2019 |
| WO | WO2007087657 A1 | 8/2007 |
| WO | WO2007134766 A1 | 11/2007 |

* cited by examiner

CIRCUIT-BREAKER AND MOBILE DEVICE

PRIORITY STATEMENT

The present application hereby claims priority under 35 U.S.C. § 119 to German patent application number DE 102019214360.1 filed Sep. 20, 2019, the entire contents of which are hereby incorporated herein by reference.

FIELD

Various example embodiments of the invention generally relate to a low-voltage circuit breaker, a mobile device and a method.

BACKGROUND

Circuit breakers are protection devices, which function in a similar way to a fuse. Circuit breakers monitor the current flowing through them via a conductor and interrupt the electric current or flow of energy to an energy sink or a load, which is referred to as tripping, when protection parameters, such as current limit values or current/time period limit values, that is to say when a current value is present for a certain time period, are exceeded. Interruption is performed, for example, by contacts of the circuit breaker, which are opened. In contrast to a fuse, in a circuit breaker these protection parameters or response values can be set, for example via a control unit, such as an electronic trip unit.

Particularly for low-voltage electrical circuits or supply systems, there are various types of circuit breakers, depending on the level of the provided electric current in the electrical circuit. Within the meaning of embodiments of the invention, circuit breaker means, in particular, switches as are used in low-voltage installations for currents of from 63 to 6300 amperes. Molded case circuit breakers are especially used for currents of from 63 to 1600 amperes, in particular of from 125 to 630 or 1200 amperes. Air circuit breakers are used, in particular, for currents of from 630 to 6300 amperes, especially of from 1200 to 6300 amperes.

Air circuit breakers are also termed ACB for short and molded case circuit breakers are termed MCCB for short.

Within the meaning of embodiments of the invention, low voltage means voltages up to 1000 volts AC or 1500 volts DC. Low voltage also means, in particular, voltages greater than extra-low voltage, with values of 50 volts AC or 120 volts DC.

Within the meaning of embodiments of the invention, circuit breaker means, in particular, circuit breakers with a control unit such as an electronic trip unit, or ETU for short, which serve as control unit. The control unit monitors the level of the electrical current measured by sensors such as a Rogowski transformer (Rogowski coil), or additionally in an analogous manner, that of the voltage and/or other parameters of the electrical circuit, and causes an interruption of the electrical circuit when thresholds are exceeded.

Circuit breakers are used in switchgear units located in switchgear rooms. In order to ensure the safety of the maintenance personnel when present in the area of the switchgear, a reduction in the delay times and a reduction in the response thresholds for the circuit breaker is required. For this purpose, in a circuit-breaker of the type mentioned above, in particular in compact and air circuit-breakers, a second set of current or current-time limits is stored, which respond at lower currents or with low (shorter) current-time limits (current must be flowing for a short time in order to cause an interruption; or lower current must be flowing for the same time; or lower current must be flowing for a shorter period of time) and which can be activated manually. Up to now, this has been initiated by manual switching or door contacts.

Circuit breakers of the above-mentioned type are known, for example, from the following patent applications: DE 10 2014 217 292 A1; DE 10 2014 217 332 A1; DE 10 2015 217 108 A1; DE 10 2014 218 831 A1; DE 10 2014 218 910 A1; DE 10 2016 201 651 A1; DE 10 2015 226 475 A1; DE 10 2015 216 981 A1; DE 10 2016 202 827 A1; DE 10 2016 201 659 A1; DE 10 2015 210 479 A1; DE 10 2014 224 173 A1; DE 10 2015 216 023 A1; DE 10 2016 217 425 A1; DE 10 2016 205 196 A1; DE 10 2016 221 093 A1; DE 10 2017 211 900 A1; DE 10 2017 201 239 A1; DE 10 2017 205 003 A1; DE 10 2017 205 004 A1; DE 10 2017 212 477 A1; DE 10 2017 214 903 A1; DE 10 2017 214 907 A1; DE 10 2017 215 820 A1.

SUMMARY

At least one embodiment of the present invention is directed to further improving upon a low-voltage circuit breaker of the type mentioned above, in particular to make the switching between parameters more practical or simpler.

Embodiments are directed to a low-voltage circuit breaker, a mobile device or a method.

According to an embodiment of the invention, a circuit breaker is proposed for protecting a low-voltage circuit when current or current-time limits are exceeded in the low-voltage circuit, having an electronic trip unit that initiates an interruption or reduction of the current flow in the low-voltage circuit when the first current or current-time limits are exceeded. The latter has second current or current-time limits, which are stored in the electronic trip unit and characterized by lower current limits or lower current-time limits (current must be flowing for a short time to cause an interruption; or lower current must be flowing for the same time; or lower current must be flowing for a shorter period of time) to cause an interruption of the low-voltage circuit. These second limit values can be activated by an initiated switchover.

According to an embodiment of the invention, a communication unit connected to the electronic trip unit, which enables wireless communication, is provided. The circuit breaker, in particular the electronic trip unit, is designed in such a way that when a wireless communication signal is received that exceeds a (first) field strength value, the second limits are activated.

According to at least one embodiment of the invention, a mobile device includes a communication unit that enables wireless communication, a display unit and an operating unit that has a Bluetooth or wireless LAN interface, for example as part of the communication unit.

The latter is:
a) activated, or
b) sends out an identifier, or
c) has an, in particular active, maintenance software that sends out a specific identifier so that communication with the circuit breaker can be established.

At least one embodiment is directed to a circuit breaker for protecting a low-voltage circuit when current or current-time limits are exceeded in the low-voltage circuit, the circuit breaker comprising:

an electronic trip unit, to initiate an interruption or reduction of current flow in the low-voltage circuit when first current limits or first current-time limits are exceeded, second current limits or second current-time limits being stored in the electronic trip unit, characterized by relatively lower current limits or relatively lower current-time limits, the second current limits or second current-time limits being activateable by an initiated switchover; and a communication unit, connected to the electronic trip unit, to enable wireless communication, the circuit breaker being designed such that when a wireless communication signal is received that exceeds a field strength value, the second current limits or second current-time limits are activated.

At least one embodiment is directed to a mobile device comprising:
a communication unit to enable wireless communication;
a display unit;
an operating unit; and
a Bluetooth or wireless LAN interface, to establish a communication with the circuit breaker of claim 1 upon:
the mobile device being activated, or
an identifier being sent out, or
active maintenance software of the mobile device sending out a specific identifier.

At least one embodiment is directed to a method for a circuit breaker, to initiate an interruption or reduction of current flow in a low-voltage circuit when the first current limits or first current-time limits are exceeded in the low-voltage circuit, the method comprising:
storing second current limits or second current-time limits, characterized by relatively lower current limits or lower current-time limits than the first current limits or first current-time limits;
activating the second current limits or second current-time limits by an initiated switchover, wherein the second current limits or second current-time limits are activated upon a wireless communication signal being received that exceeds a field strength value

BRIEF DESCRIPTION OF THE DRAWINGS

The described properties, features and advantages of this invention and the manner in which they are achieved become more clearly and distinctly comprehensible in conjunction with the following description of the example embodiments, which are explained in more detail in connection with the drawing.

Here, in the drawings.

DETAILED DESCRIPTION OF THE EXAMPLE EMBODIMENTS

Figure 1:
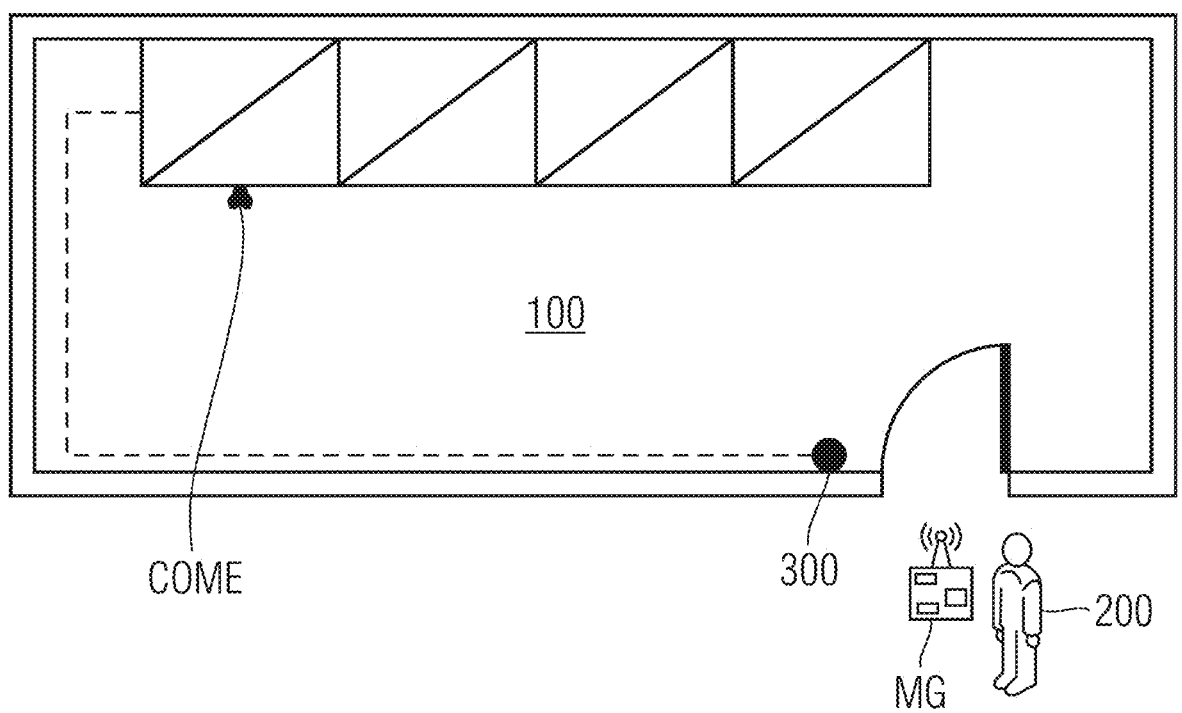
FIG. 1 shows a schematic switchgear room.

The above and other elements, features, steps, and concepts of the present disclosure will be more apparent from the following detailed description in accordance with example embodiments of the invention, which will be explained with reference to the accompanying drawings.

Some examples of the present disclosure generally provide for a plurality of circuits, data storages, connections, or electrical devices such as e.g. processors. All references to these entities, or other electrical devices, or the functionality provided by each, are not intended to be limited to encompassing only what is illustrated and described herein. While particular labels may be assigned to the various circuits or other electrical devices disclosed, such labels are not intended to limit the scope of operation for the circuits and the other electrical devices. Such circuits and other electrical devices may be combined with each other and/or separated in any manner based on the particular type of electrical implementation that is desired. It is recognized that any circuit or other electrical device disclosed herein may include any number of microcontrollers, a graphics processor unit (GPU), integrated circuits, memory devices (e.g., FLASH, random access memory (RAM), read only memory (ROM), electrically programmable read only memory (EPROM), electrically erasable programmable read only memory (EEPROM), or other suitable variants thereof), and software which co-act with one another to perform operation(s) disclosed herein. In addition, any one or more of the electrical devices may be configured to execute a program code that is embodied in a non-transitory computer readable medium programmed to perform any number of the functions as disclosed.

It is to be understood that the following description of embodiments is not to be taken in a limiting sense. The scope of the invention is not intended to be limited by the embodiments described hereinafter or by the drawings, which are taken to be illustrative only.

The drawings are to be regarded as being schematic representations, and elements illustrated in the drawings are not necessarily shown to scale. Rather, the various elements are represented such that their function and general purpose become apparent to a person skilled in the art. Any connection, or communication, or coupling between functional blocks, devices, components, or other physical or functional units shown in the drawings or described herein may also be implemented by an indirect connection or coupling. A communication between devices may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes;

etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

According to an embodiment of the invention, a circuit breaker is proposed for protecting a low-voltage circuit when current or current-time limits are exceeded in the low-voltage circuit, having an electronic trip unit that initiates an interruption or reduction of the current flow in the low-voltage circuit when the first current or current-time limits are exceeded. The latter has second current or current-time limits, which are stored in the electronic trip unit and characterized by lower current limits or lower current-time limits (current must be flowing for a short time to cause an interruption; or lower current must be flowing for the same time; or lower current must be flowing for a shorter period of time) to cause an interruption of the low-voltage circuit. These second limit values can be activated by an initiated switchover.

According to an embodiment of the invention, a communication unit connected to the electronic trip unit, which enables wireless communication, is provided. The circuit breaker, in particular the electronic trip unit, is designed in such a way that when a wireless communication signal is received that exceeds a (first) field strength value, the second limits are activated.

This has the advantage that door contacts or manual switching can be omitted if maintenance personnel with a mobile device, such as a mobile phone, smartphone, portable computer (laptop, notebook, etc.), which has a wireless transmission function, are in the vicinity of the circuit breaker. As the changeover to digital technology progresses, mobile devices are being increasingly used to maintain the switches. If a circuit breaker then detects a mobile device, the parameters are switched over and a safe state is established. This can also be used for protection, for example, if people are present in the vicinity of the switchgear.

Advantageous embodiments are specified in the claims.

In an advantageous embodiment of the invention, the activation of the second limit values only occurs when a specific identifier is received.

This has the particular advantage that only authorized maintenance personnel/persons who have a specific identifier can activate the parameters with reduced values.

In an advantageous embodiment of the invention, the specific identifier is received via Bluetooth.

This has the particular advantage that a particularly simple and practical solution is available.

In an advantageous embodiment of the invention, the specific identifier is received via wireless LAN.

This has the particular advantage that a particularly simple and practical solution is available which is based on a known, widespread technology.

In an advantageous embodiment of the invention, the second limits are activated only when communication is established with a maintenance software on a mobile device.

This has the particular advantage that the protection parameters for personal protection are only reduced for maintenance personnel with the appropriate maintenance software, i.e. certified personnel.

In an advantageous embodiment of the invention, the circuit breaker is located in a switchgear room, which is in particular enclosed.

This has the particular advantage that, in particular, the variant that the second set of limits is only activated when a wireless communication signal is received that exceeds a field strength value, is simple and safe to use, that switchgear rooms are generally well shielded so that extraneous fields are not present or only very weakly present, thus ensuring a reliable operation.

In an advantageous embodiment of the invention, the circuit breaker is located in a switchgear, wherein an additional communication unit connected to the circuit breaker, in particular to the electronic trip unit, is provided on the switchgear.

This has the particular advantage that in enclosed switchgear units (e.g. control cabinets, particularly those made of metal), e.g. with a plurality of circuit breakers on the switchgear, a module can be provided that carries out the respective identification and passes this information on to the (shielded) circuit breakers.

According to at least one embodiment of the invention, a mobile device includes a communication unit that enables wireless communication, a display unit and an operating unit that has a Bluetooth or wireless LAN interface, for example as part of the communication unit.

The latter is:
a) activated, or
b) sends out an identifier, or
c) has an, in particular active, maintenance software that sends out a specific identifier so that communication with the circuit breaker can be established.

This advantageously provides communication with the circuit breaker to activate the protection parameters.

In an advantageous embodiment of the invention, two-way communication with the circuit breaker is established. If the second limits in the circuit breaker are not activated, which is reported back to the mobile device by the circuit breaker via the two-way communication, an alarm message is generated in the mobile device and displayed on the mobile device, e.g. via the display device.

This has the particular advantage that a feedback signal is provided about the non-activated, or alternatively or additionally, the activated protection status of the circuit breaker.

At least one embodiment of the invention is directed to a parallel method.

All embodiments, result in an improvement of a low-voltage circuit breaker, in particular in order to make the switching between parameters more practical or simpler, in particular to improve personal safety.

FIG. 1 shows a schematic view of a switchgear room 100. If a person 200 enters the switchgear room 100 for maintenance work, previously the person had to operate a switch 300 in order to activate the prescribed reduction in the protection parameters for personnel safety.

FIG. 1 also shows another communication unit COME, for example an external communication unit, which may be arranged or provided on a switchgear connected to the circuit breaker(s), in particular the electronic trip unit, arranged in the switchgear.

Figure 2:
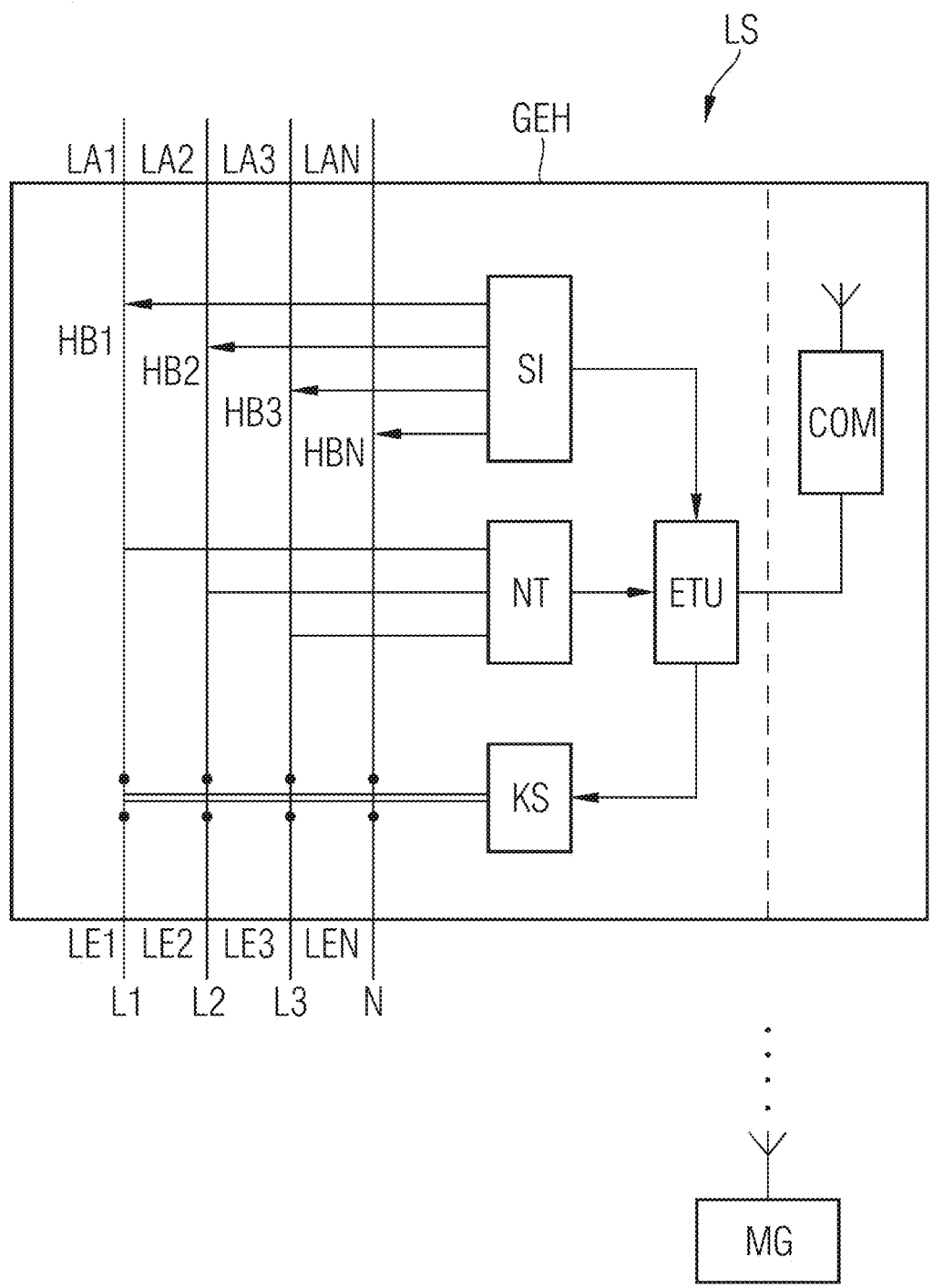
FIG. 2 shows a schematic representation of a circuit breaker.

FIG. 2 shows a circuit breaker LS according to an embodiment of the invention for a low-voltage circuit, in the example a three-phase AC circuit with three phase conductors L1, L2, L3 and a neutral conductor N, having:

- first connections LE1, LE2, LE3, LEN for the low-voltage circuit, for example, on a housing GEH, which are connected via main current paths HB1, HB2, HB3, HBN to second connections LA1, LA2, LA3, LAN for the low-voltage circuit, for example on the housing GEH;
- a contact system KS which can interrupt the main current paths HB1, HB2, HB3, HBN in order to cause an interruption of the low-voltage circuit;
- a sensor unit SI which detects the electrical current or other electronic parameters of the main current paths HB1, HB2, HB3, HBN or at least one main current path of the low-voltage circuit;
- an electronic trip unit ETU (control unit) connected to the sensor unit SIE and the contact system KS and, if at least one limit of the electronic parameter is exceeded, causes an interruption of the main current paths HB1, HB2, HB3, HBN via the contact system KS;
- a power supply unit NT connected to the electronic trip unit ETU and the main current paths HB1, HB2, HB3, HBN for supplying power to the electronic trip unit ETU (control unit); for example, in a standard configuration, one main current path forms the primary side of an energy converter;
- a communication unit COM connected to the electronic trip unit ETU, which enables wireless communication. This can be arranged inside or outside the housing GEH, as indicated by dashed lines.

For example, it can be located on the switchgear, see the position COME in FIG. 1.

In FIG. 2 a mobile device MG is also provided, with a communication unit that enables wireless communication, a display unit, and an operating unit.

As previously described, according to the invention the mobile device is in contact with the circuit breaker.

According to an embodiment of the invention, it is now proposed that a mobile device MG is detected when a person enters the room 100.

In a first simple embodiment, this can be carried out by receiving a wireless communication signal from the mobile device MG that exceeds a field strength value. Since a mobile device MG generates an increased field strength value in the room 300, this can be determined simply by comparison of threshold values, the circuit breaker LS has a communication unit COM, COME, which can be used to determine a field strength. The field strength comparison can be performed there or, for example, in the electronic trip unit ETU.

If the field strength value is exceeded, the second set of limits is activated.

Alternatively, this can be effected via an identifier. For example, this can be a known or previously entered identifier of the mobile device MG/wireless-LAN or Bluetooth. If this identifier is received, the second limits are activated. WLAN and Bluetooth are particularly suitable for this.

Alternatively, detection can be performed with a maintenance software installed and activated on the mobile device MG, which in this case is, e.g., a smartphone or laptop.

When the maintenance software is detected, the activation of the second limits, i.e. switchover to the second limits, can take place automatically.

This means that a switchover can no longer be forgotten or ignored. Security is significantly increased.

The communication unit COM, COME, e.g. a wireless module, in the circuit breaker LS is normally active. The communication unit COM, COME constantly receives devices located in the locality. The received devices are compared with the stored identifier in terms of the received ID for activating the second set of limits, and an activation is carried out if the values match.

For example, if circuit breakers LS and mobile device MG with an active identical radio standard are found, they try to connect (e.g. in the case of Bluetooth they must have been paired beforehand). If a connection can be established between the mobile device MG and the communication unit COM, COME (wireless module) of the protective device, the maintenance software installed on the mobile device, e.g. a management app for power systems, will attempt to exchange with the connected circuit breaker.

In this case, it is assumed that the user with the mobile device MG is located within range of the circuit breaker LS, i.e. the switchgear room, in which the protection parameters are to be reduced in the interest of personnel safety. If this has not yet occurred, according to the invention this reduction takes place automatically.

The communication unit COM, COME (wireless module) described here establishes a connection between the e.g. electronic trip unit ETU (controller), or switch-internal data bus, and the mobile device MG.

In a first use case, Bluetooth is used. Alternatively, the ZigBee standard can also be used. Wi-Fi would also be an option.

A bidirectional method (in particular not a broadcast) would be advantageous, where automatic detection of the connection possibility is provided.

In the case in which an identifier is used: if a person enters the switchgear room with a mobile device unknown to the circuit breaker including the communication unit (e.g. for the first time), the personnel protection must be activated by the previous method (manual switch or via communication from the control room). The invention only works after an initial configuration of the identifier.

If a circuit breaker LS detects a mobile device MG with corresponding active maintenance software, an alarm message can be generated if the protection parameters have not been switched over, or alternatively or additionally the parameters can be switched over independently, and the safe state established.

The safety of the maintenance personnel is significantly increased, as the required parameter switching can no longer be forgotten or ignored (if configured accordingly).

Although the invention has been described and illustrated in detail by way of the example embodiment, the invention is not restricted by the disclosed examples and other variations can be derived herefrom by a person skilled in the art without departing from the scope of protection of the invention.

Although the invention has been illustrated in greater detail using the example embodiments, the invention is not limited by the disclosed examples, and a person skilled in the art can derive other variations therefrom without departing from the scope of protection of the invention.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A circuit breaker for protecting a low-voltage circuit when current or current-time limits are exceeded in the low-voltage circuit, the circuit breaker comprising:
    an electronic trip unit, to initiate an interruption or reduction of current flow in the low-voltage circuit when first current limits or first current-time limits are exceeded, second current limits or second current-time limits being stored in the electronic trip unit, characterized by relatively lower current limits or relatively lower current-time limits, the second current limits or second current-time limits being activateable by an initiated switchover; and
    a communication unit, connected to the electronic trip unit, to enable wireless communication, the circuit breaker being designed such that when a wireless communication signal is received that exceeds a field strength value, the second current limits or second current-time limits are activated.

2. The circuit breaker of claim 1, wherein the second current limits or second current-time limits are activated only when a specific identifier is received within the wireless communication signal.

3. The circuit breaker of claim 2, wherein the specific identifier is received via Bluetooth.

4. The circuit breaker of claim 2, wherein the specific identifier is received via wireless LAN.

5. The circuit breaker of claim 1, wherein the second current limits or second current-time limits are activated only when communication is established with a maintenance software on a mobile device.

6. The circuit breaker of claim 1, wherein the circuit breaker is located in a switchgear room.

7. The circuit breaker of claim 1, wherein the circuit breaker is located in a switchgear, wherein an additional communication unit connected, to the circuit breaker, is provided on the switchgear.

8. A mobile device comprising:
    a communication unit to enable wireless communication;
    a display unit;
    an operating unit; and
    a Bluetooth or wireless LAN interface, to establish a communication with the circuit breaker of claim 1 upon:
        the mobile device being activated, or
        an identifier being sent out, or
        active maintenance software of the mobile device sending out a specific identifier.

9. The mobile device of claim 8, wherein two-way communication is established with the circuit breaker, and wherein an alarm message is generated and displayed on the mobile device upon the current limits or second current-time values not being activated.

10. A method for a circuit breaker, to initiate an interruption or reduction of current flow in a low-voltage circuit when the first current limits or first current-time limits are exceeded in the low-voltage circuit, the method comprising:
    storing second current limits or second current-time limits, characterized by relatively lower current limits or lower current-time limits than the first current limits or first current-time limits;
    activating the second current limits or second current-time limits by an initiated switchover, wherein the second current limits or second current-time limits are activated upon a wireless communication signal being received that exceeds a field strength value.

11. The method of claim 10, wherein the second current limits or second current-time limits are activated only when a specific identifier is received within the wireless communication signal.

12. The method of claim 11, wherein the specific identifier is received via Bluetooth.

13. The method of claim 11, wherein the specific identifier is received via wireless LAN.

14. The method of claim 10, wherein the second current limits or second current-time limits are activated only when communication is established with a maintenance software on a mobile device.

15. The circuit breaker of claim 2, wherein the second current limits or second current-time limits are activated only when communication is established with a maintenance software on a mobile device.

16. The circuit breaker of claim 6, wherein the switchgear room is enclosed.

17. The method of claim 11, wherein the second current limits or second current-time limits are activated only when communication is established with a maintenance software on a mobile device.

18. The method of claim 12, wherein the second current limits or second current-time limits are activated only when communication is established with a maintenance software on a mobile device.

19. The method of claim 13, wherein the second current limits or second current-time limits are activated only when communication is established with a maintenance software on a mobile device.

* * * * *